United States Patent [19]
Hall et al.

[11] 3,951,634
[45] Apr. 20, 1976

[54] METHOD OF AND APPARATUS FOR BENDING AND TEMPERING THIN GLASS SHEETS

[75] Inventors: Harold R. Hall, Whitehouse; Richard A. Herrington, Walbridge, both of Ohio; Martin Huizinga, Lambertville, Mich.; Donald D. Rahrig; Robert G. Revells, both of Toledo, Ohio

[73] Assignee: Libbey-Owens-Ford Company, Toledo, Ohio

[22] Filed: June 20, 1974

[21] Appl. No.: 481,307

[52] U.S. Cl.............................. 65/104; 65/114; 65/273; 65/349
[51] Int. Cl.² .................. C03B 23/02; C03B 27/00
[58] Field of Search ............ 65/104, 114, 273, 349, 65/350

[56] References Cited
UNITED STATES PATENTS

| | | | |
|---|---|---|---|
| 2,646,647 | 7/1953 | Bamford et al. | 65/114 X |
| 3,298,810 | 1/1967 | McKelvey | 65/114 X |
| 3,338,695 | 8/1967 | Ritter, Jr. | 65/104 |
| 3,365,285 | 1/1968 | Richardson | 65/104 |
| 3,672,861 | 6/1972 | Ritter, Jr. et al. | 65/114 X |
| 3,880,653 | 4/1975 | Jack et al. | 65/106 |

*Primary Examiner*—Arthur D. Kellogg
*Attorney, Agent, or Firm*—Collins, Oberlin & Darr

[57] ABSTRACT

A method of and apparatus for bending and tempering a relatively thin glass sheet while supported horizontally and conveyed along a generally horizontal path comprising heating the glass sheet to its softening point, bending the sheet into the desired curvature, reorienting the bent sheet for further processing along said horizontal path, reheating the sheet to the temperature necessary for proper tempering, and finally, chilling the sheets rapidly below the annealing temperature range of the glass.

25 Claims, 11 Drawing Figures

METHOD OF AND APPARATUS FOR BENDING AND TEMPERING THIN GLASS SHEETS

BACKGROUND OF THE INVENTION

The present invention relates generally to the production of curved, tempered sheets of glass and, more particularly, to an improved method of and apparatus for bending and heat treating relatively thin glass sheets.

Bent sheets of glass are commonly used as glazing closures in vehicles such as automobiles and the like. For such applications, the glass sheets must be bent to precisely defined curvatures dictated by the configuration and size of the openings and the overall styling of the vehicle. Additionally, it is necessary that bent glass sheets utilized as glazing closures in vehicles be tempered to increase their resistance to damage resulting from impact and, in the event of breakage, to fragment into relatively small harmless particles as opposed to the large, jagged, potentially dangerous pieces otherwise resulting from untempered glass sheets when broken. Further, it is important that the bent and tempered glass sheets meet stringent optical requirements and that the viewing area of glazing closures be free of surface defects and optical distortions that would interfere with clear vision therethrough.

Generally, the commercial production of curved, tempered sheets of glass for such purposes includes heating pretrimmed, flat sheets of glass to the softening temperatures thereof, bending the heated sheets to a desired curvature between a pair of complementary mold sections and then chilling the bent sheets in a controlled manner to a temperature below the annealing range of glass. In a mass production operation, the above operations are carried out successively while the sheets of glass are being advanced substantially continuously along a fixed path including a heating area, a bending area and a chilling or tempering area whereby the heat initially imparted to the sheet to bring it to the proper bending temperature can also be utilized in the final heat treating or tempering operation. To achieve a satisfactory temper, the temperature of the glass sheet must be above a predetermined minimum level upon entering the tempering area. The residual heat remaining in glass sheets of conventional thicknesses, such as those having thicknesses ranging from 0.235 inch to 0.255 inch for example, generally is above such predetermined minimum level after bending for immediate advancement into the tempering area.

However, in recent years, considerable emphasis has been placed on the use of thinner glass sheets for automotive glazing purposes, the thicknesses thereof preferably ranging from about 0.125 inch to 0.156 inch for example. While the process described above is admirably suited for the mass production of the thicker glass sheets, the same process for the production of relatively thinner glass sheets has not been successful. This is due to the rapid loss of heat in the thin sheets during bending which is occasioned by the relatively cool bending tools and cooler ambient atmosphere of the bending area, which decreases the temperature of the glass sheets to a level below the minimum temperature at which adequate tempering can be effected. On the other hand, overheating the thin sheets of glass prior to bending to compensate for the rapid subsequent loss of heat during bending tends to degrade the surface quality of the finished glass as a result of heat stains, pitting, and the like. Also, such initial overheating renders the sheets extremely pliable with attendant loss of the deformation control necessary to maintain the bent sheets within the close tolerances dictated by automobile design and styling requirements.

SUMMARY OF THE INVENTION

Accordingly, it is a primary object of the present invention to provide a new and improved method of and apparatus for shaping and tempering relatively thin sheets of glass supported in a horizontal plane during movement thereof in a generally horizontal path.

Another object of this invention is to reheat a thin bent glass sheet to the minimum temperature range required to achieve the viscous condition necessary for tempering immediately after bending and just prior to the entry thereof into the tempering station.

A further object of the present invention is to reposition the bent glass sheet immediately after bending into an orientation minimizing objectionable conveyor roll marking or distortion lines and permitting optimum spacing of the tempering blasthead outlets from opposite surfaces of the glass sheets.

In one aspect thereof, the present invention is characterized by the provision of a boost heating station interposed between the bending and tempering stations of existing horizontal production lines for reheating a thin glass sheet immediately after bending and just prior to tempering to impart thereto a sufficient temperature to bring the sheet to the viscous state necessary for obtaining a proper temper while maintaining glass quality and the desired curvature of the bent sheet within close tolerances. The reheating operation is performed automatically as an incident to the movement of the sheet in its horizontal disposition along a generally horizontal path as an integral part of an existing bending and tempering production line.

In another aspect thereof, a rotatable mold member is incorporated in the bending apparatus to reorient the bent sheet for deposition on the conveyor system after bending into an optimum position minimizing optical defects and facilitating tempering.

The foregoing and other objects, advantages, and characterizing features of the present invention will become clearly apparent from the ensuing detailed description thereof considered in conjunction with the accompanying drawings wherein like reference numerals denote like parts throughout the various views.

DESCRIPTION OF THE PREFERRED EMBODIMENT

Figure 1:
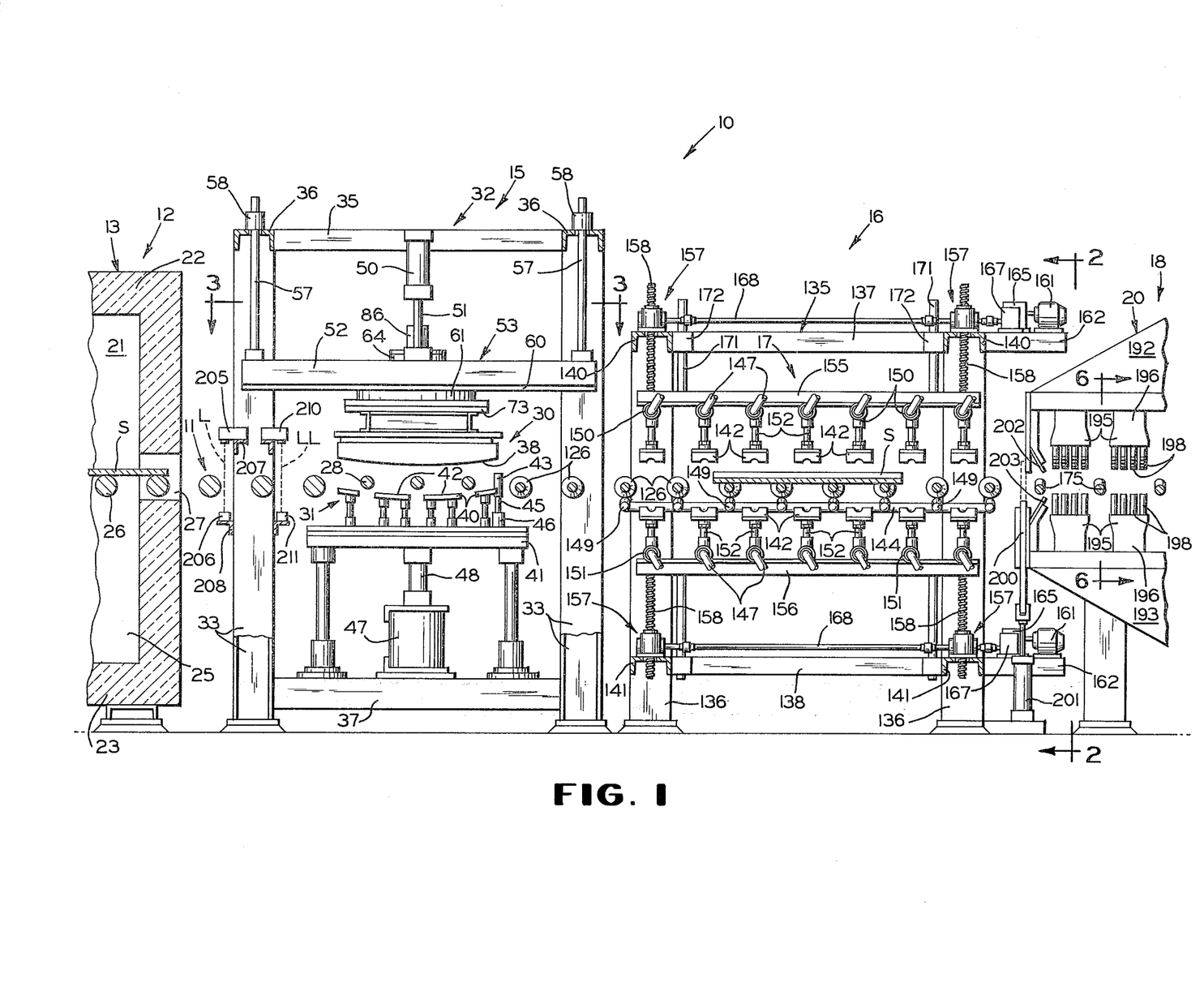
FIG. 1 is a side elevational view of a bending and tempering apparatus incorporating the novel features of the present invention.

Referring now in detail to the illustrative embodiment depicted in the accompanying drawings for carrying out this invention, there is shown in FIG. 1 a glass sheet bending and tempering apparatus, comprehensively designated 10, which includes a continuous conveyor system 11 adapted to support a plurality of sheets S in a generally horizontal plane for movement along a continuous, substantially horizontal path through a heating station 12 having a furnace 13 for heating the sheets to their softening point or bending temperature, a bending station 15 having means for bending the heated sheets S to the desired curvature, a novel boost heating station 16 having a furnace section 17 for reheating the bent sheets to the temperature required for tempering, and a tempering station 18 having chilling means 20 for rapidly reducing the temperature of the reheated sheets to produce the desired temper therein.

In the illustrated embodiment, the glass sheets are heated in the furnace 13, which is of the tunnel-type having side walls 21, a top wall 22, and a bottom wall 23 defining a heating chamber 25. The heating chamber 25 can be heated in any desired manner by suitable heating means, such as gas burners or electrical resistance elements for example (not shown) located in the top and side walls of the furnace 13. Such heating means are suitably controlled by apparatus (also not shown) to obtain the desired temperature at various points in the heating chamber 25. The sheets S are carried through the heating chamber 25 of the furnace on a plurality of conveyor rolls 26, forming part of the conveyor system 11, and extending transversely across the chamber 25 with their opposite ends projecting through the opposite side walls 21 and suitably journalled in bearing blocks (not shown) located exteriorly of and along the side walls 21 of the furnace.

A plurality of glass sheets S are individually loaded on and supported in a generally horizontal plane on the longitudinally spaced conveyor rolls 26 at the entrance end of the furnace (not shown) and heated in a controlled manner to the desired bending temperature during their passage therethrough. Upon emerging through an opening 27 at the exit end of the furnace 13, the heated glass sheets S are transferred from conveyor rolls 26 onto a second series of spaced conveyor rolls 28, also part of the conveying system 11 and which are journalled at their opposite ends in suitable bearing blocks (not shown) located along and on opposite sides of the bending station 15. As shown in FIG. 1, the rolls 28 are smaller in diameter than the rolls 26 to define a larger space therebetween for a purpose hereinafter described in detail. The series of rolls 28 support the glass sheets S horizontally for movement into and within the bending station 15 between a pair of complementary bending mold members, hereinafter described, before and after bending, and then convey them to the boost heating station 16.

The bending means comprises a rotatable upper male mold member 30 and a lower female mold member 31 having opposed complemental shaping surfaces conforming in curvature to the shape of the sheets when bent and which are mounted for relative movement toward and away from each other on a structural frame 32, which includes two substantially vertically disposed columns 33 located at each side of the conveyor system and spaced longitudinally therealong with the columns on opposite sides of the conveyor being laterally aligned. The columns 33 extend upwardly above the conveyor rolls 28 and are tied together at their upper and lower ends respectively, by horizontally disposed beams 35 and 36 extending longitudinally and transversely of the conveyor, respectively, and secured at their opposite ends to the aligned columns 33 to form a rigid, box-like structure. A base member 37 extends between the upright columns 33 for supporting the female mold member 31 and associated parts.

The male mold member 30 has a downwardly directed, generally convex shaping surface 38 and is mounted above the rolls 28 for vertical reciprocal movement and rotatable movement relative to frame 32 while the female mold member 31 is located below the conveyor rolls 28 and mounted for vertical movement toward and away from the male mold member 30. To permit displacement of the female mold member 31 above the level of conveyor rolls 28 for lifting the sheets S thereabove, such member 31 is formed of a plurality of segments 40 mounted on a carriage 41 and spaced apart a sufficient distance to allow the segments 40 to pass between adjacent rolls 28. As mentioned above, the diameter of rolls 28 are formed of a relatively small diameter for the purpose of providing maximum clearance therebetween for the passage of the segments 40 therethrough. The segments 40 form a composite, ring-type structure having a generally concave shaping surface 42 complementary to the shaping surface 38 of male mold member 30.

At least a pair of laterally spaced locating devices in the form of retractable stop members 43 (only one of which is shown in FIG. 1) are positioned in the path of movement of glass sheet S to interrupt movement thereof and accurately position the same in the desired location relative to the mold members 30 and 31. Each stop member 43 is secured to the distal end of a piston rod 45 of a fluid actuating cylinder 46 mounted on the carriage 41. The cylinders 46 are operative to raise and lower the stop members 43 between an upper position above rolls 28 in the path of movement of a glass sheet S and a lower position therebeneath.

The carriage 41 is vertically movable by a fluid actuator 47 mounted on base member 37 and having a suitable piston rod 48 for raising and lowering the female mold member 31 between a lower position below conveyor rolls 28 and an upper position thereabove for lifting a heated glass sheet S from the conveyor rolls 28 and pressing the same against male mold member 30 between the complemental shaping surfaces 38 and 42, thus forming the glass sheet into the desired curvature.

Figure 3:
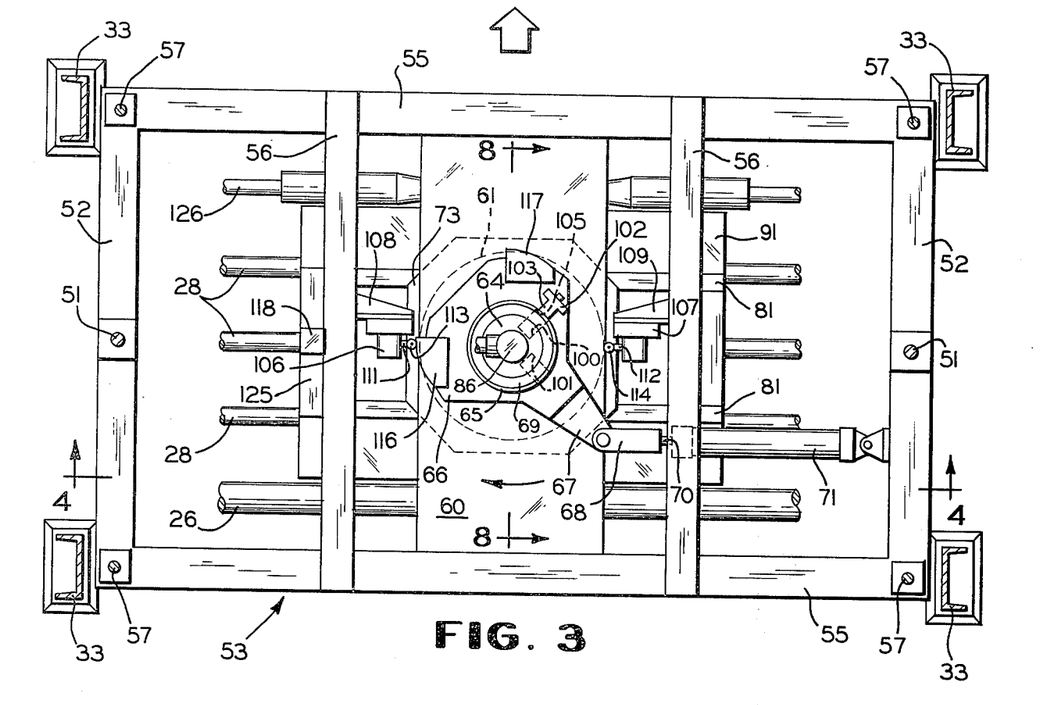
FIG. 3 is a horizontal sectional view, on an enlarged scale, taken about on line 3—3 of FIG. 1, showing the rotatable mold member and actuator therefor.
Figure 4:
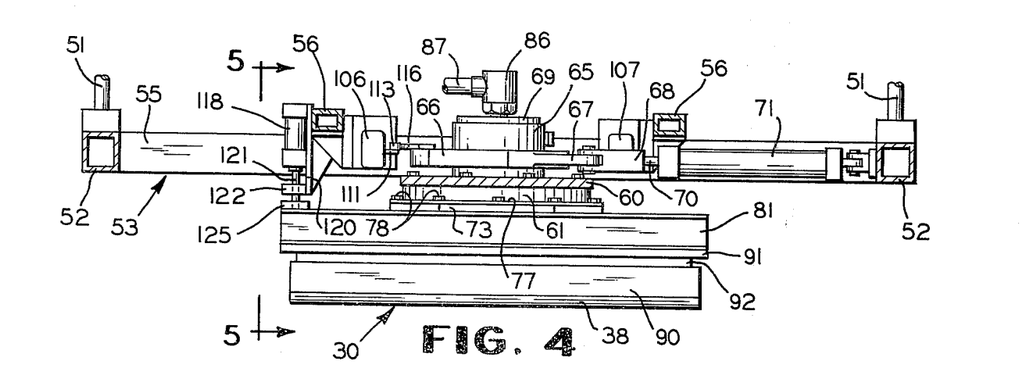
FIG. 4 is a vertical sectional view taken about on line 4—4 of FIG. 3.

The means for supporting the male mold member 30 on the frame 32 includes a pair of actuating cylinders 50 mounted on the upper horizontal beams 35 and having suitable reciprocable pistons (not shown) provided with piston rods 51 connected at their outer ends to the spaced, horizontally extending end members 52 of a vertically reciprocal platen frame 53. As best shown in FIG. 3, the platen frame 53 has a generally rectangular outline in plan and includes a pair of horizontal structural members 55 extending transversely of the conveyor and a pair of tie members 56 intermediate the end members 52 in substantial parallelism with the latter. A plurality of guide posts 57 are connected at their lower ends to the four corners of platen frame 53, respectively, and extend upwardly through suitable bushings 58 mounted on upper beams 36 for sliding movement relative thereto for maintaining the platen frame 53 properly oriented in a horizontal direction. A central support plate 60 is secured to platen frame 53 and extends transversely thereacross.

A significant feature of the present invention is the provision of a rotatable mold member for reorienting the glass sheet after bending for the following reasons. The engagement of the conveyor rolls with the glass sheet during heating sometimes imparts elongated "roll marks" to the sheet, which extend in a direction parallel to the rolls and ultimately appears as elongated distortion lines or bands in the finished glass product. While such distortion lines in a horizontal direction in an upright automotive glazing closure are tolerable, their presence in a vertical disposition creates a potential optical distortion problem. Thus, if the glazing closure produced by the apparatus of this invention is intended to be mounted in an upright position with the curvature thereof extending vertically or curved from the lower to the upper end thereof, any distortion lines preferably should extend transversely thereof in a horizontal direction. To insure such a roll mark orientation relative to the direction of curvature of the sheet, the male mold member 30 of the illustrative embodiment is positioned in the manner shown in FIG. 1 with the shaping surface 38 thereof being arcuately curved in a direction longitudinally of the conveyor system or about an axis parallel to the axes of conveyor rolls 28 and normal to the path of movement of the sheet.

However, it should also be appreciated that it has been found desirable to space the multiplicity of opposed blasthead tubes, as hereinafter described, an equal, optimum distance from the opposite surfaces of the bent glass sheet to obtain a quality temper. To offer versatility in blasthead tube design for achieving such equal spacing, the curved sheets must be oriented with their curvatures extending transversely of their path of movement through the blasthead. Because of the rotatable capability of male mold member 30, the latter is operable to reorient the glass sheet immediately after bending and deposit the same on the conveyor in the best position possible for subsequent tempering.

Figure 8:
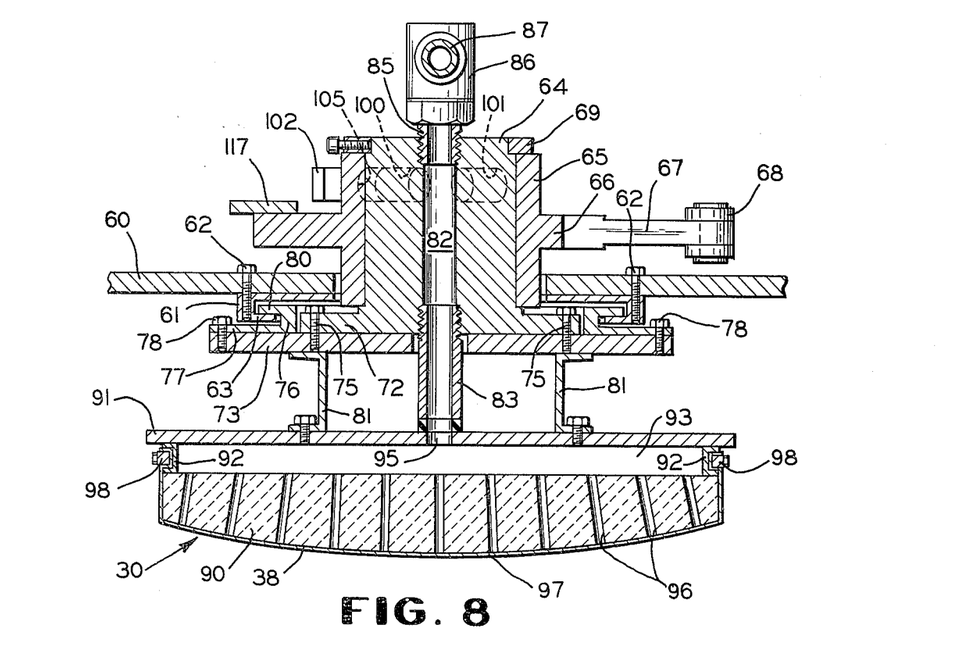
FIG. 8 is a vertical sectional view, on an enlarged scale, taken about on line 8—8 of FIG. 3, showing details of the male mold member.

As best shown in FIG. 8, the means rotatably supporting the male mold member 30 comprises a bearing 61 secured, as by suitable fasteners 62, to the underside of plate 60 centrally thereof and having an inwardly directed flange 63 for a purpose that will presently appear. Such means also include a pivot post 64 rotatably mounted within a sleeve 65 formed as an integral part of a pivotal bracket 66 having an extension 67 pivotally secured, as by means of a clevis 68, to the piston rod 70 of an actuating cylinder 71 mounted on the platen frame 53. A collar 69, in abutting relation against the upper end of sleeve 65, is disposed about the upper, reduced diameter portion of post 64 and is secured in place by means of a suitable set screw. The pivot post 64 is provided with a lower, outwardly extending flange 72 secured to a mold supporting base plate 73 by suitable fasteners 75. An inner bearing member 76 is secured at its lower flange 77 to the upper face of plate 73 by fasteners 78, and is provided with an outwardly extending flange 80 adapted to engage and rest on the bearing flange 63 for rotatable movement relative thereto. A pair of spaced, parallel, channel members 81 are welded or otherwise fixedly secured to the underside of plate 73 for detachably supporting the male mold member 30 thereto. Thus, the male mold member 30, by means of its connection to pivot post 64, is rotatably mounted relative to bearing 61 and the support plate 60.

The pivot post 64 has a central passage 82 communicating at its opposite ends with conduits 83 and 85, respectively, threaded thereinto. The pipe section 85 is suitably coupled to a swivel joint 86 having a vacuum line 87 connected thereto and leading to a suitable source of vacuum (not shown) for a purpose which will hereinafter become apparent.

As shown in FIG. 8, the male mold member 30 comprises a substantially solid body 90 formed of any suitable refractory material capable of withstanding the elevated temperatures to which the mold is subjected. The mold member 30 has a generally rectangular configuration in plan with the longer sides thereof extending transversely of the path of movement of the glass sheets S and, when viewed in elevation as shown in FIG. 1, the arcuately curved shaping surface 38 curves convexly in a direction longitudinally of such path or along the shorter, transverse dimension of the mold member 30. Stating this another way, the shaping surface 38 is effective to impart a curvature to the sheet S, with the axis of the curvature extending in a direction normal to the path of movement of the sheet as it is conveyed through the furnace 13 and into position between the molds 30 and 31. However, it should be understood that the particular outline of the mold, as well as the specific curvature of shaping surface 38, is dictated by the desired shape of the glass being bent. Also, while the shaping surface 38 is shown curved convexly in one direction, i.e., longitudinally of the conveyor system and having only a single radius of curvature for ease of illustration, it should be appreciated that multiple radii curvatures in either one or both directions are contemplated.

The mold body 90 is connected to a base plate 91 by means of a pair of spaced structural channels 92 defining with the plate 91 and the upper surface of mold body 90, a manifold 93 communicating with conduit 83 through an opening 95 in base plate 91 and with a plurality of passages 96 extending through the mold body 90 and leading to the outer face thereof. Thus, a suction force is provided along the shaping surface 38 of male mold member 30 for holding the glass sheet thereto for a purpose hereinafter explained. In lieu of a generally solid body having a plurality of vacuum passages therethrough, the body 90 can be formed of a porous refractory material throughout, if desired, to effect a more uniform suction force along the mold shaping surface 38.

To provide a soft, non-abrasive surface in contact with the glass sheet and to provide additional insulation, the shaping surface 38 is covered with a sheet of insulating cloth 97, such as woven or knit fiberglass. The cloth 97 is stretched tautly over the shaping surface 38 and held in place by retainer bars 98 which are bolted to the channel members 92. The cloth 97 is porous to establish communication of the outer surface thereof with the suction force acting through passages 96, manifold 93, passage 82, and the vacuum line 87.

Means are provided for selectively positioning the mold member 30 in either one of two positions spaced 90° apart. To this end, a pair of radial bores 100 and 101 (FIGS. 3 and 8), provided with suitable bushings, respectively, are formed in the pivot post 64 extending radially inwardly from the peripheral surface thereof and circumferentially spaced 90° apart. The positioning means includes a locking pin 102 having a shank portion 103 adapted to be inserted through an opening 105 formed in the bracket sleeve 65 and aligned with either of the pivot post bores 100 and 101. In the illustrated embodiment depicted in FIG. 3, the pin 103 is inserted in bore 100 to normally position the male mold member 30 with its longer sides extending transversely of the path of movement of the glass sheet. However, the male mold member 30 can be oriented 90° from that shown in FIG. 3 by rotating the same 90° to bring the pivot post bore 101 into registry with the opening 105 in bracket sleeve 65 and then inserting the pin 102 into the aligned openings.

As mentioned above, the cylinder 71 is operative to pivot bracket 66 and thereby post 64 to swing the male mold member 30 in a horizontal plane from a glass receiving and bending position (shown in FIG. 3) to a glass releasing position in which the mold member 30 is oriented 90° from that shown in FIG. 3. To preclude sudden stops at either of these angular end positions and to facilitate a smooth operation, means are provided for gradually retarding the pivotal movement of male mold member 30 as it approaches the end of either of such angular positions. To this end, a pair of diametrically opposed, cam operated fluid control valves 106 and 107 are provided and are suitably mounted on brackets 108 and 109 connected to the spaced intermediate beams 56. These valves are provided with actuators 111 and 112 having cam followers in the form of rollers 113 and 114 positioned in the path of movement of a pair of cams 116 and 117 mounted on the upper surface of bracket 66 and spaced apart 90° (FIG. 3). Thus, when the piston in cylinder 71 is extended and approaches the end of its stroke for example, cam 117 engages roller 114 to actuate control valve 107, progressively restricting the flow of fluid under pressure to cylinder 71 until the piston therein reaches the end of its stroke to gradually retard pivotal movement of bracket 66 to its final angular position. When cylinder 71 is shifted in the opposite direction, cam 116 engages roller 113 to actuate the control valve 106 and effect the same retarding action in the reverse direction to gradually bring bracket 66 to its initial starting position.

Means are provided for locking the male mold member 30 in its initial rotary position, i.e., the position shown in FIGS. 1 and 3 or the position in which bending occurs to assure accurate alignment thereof with the female mold member 31. Such means include an actuating cylinder 118 mounted on a plate 120 secured to the intermediate beam 56 and having a reciprocating plunger or locating pin 121 extending through a guide ring 122, also mounted on the plate 120. The pin 121 is adapted to be inserted into an opening 123 formed in a plate 125 secured at its opposite ends on the channel members 81 adjacent their one end.

Figure 5:
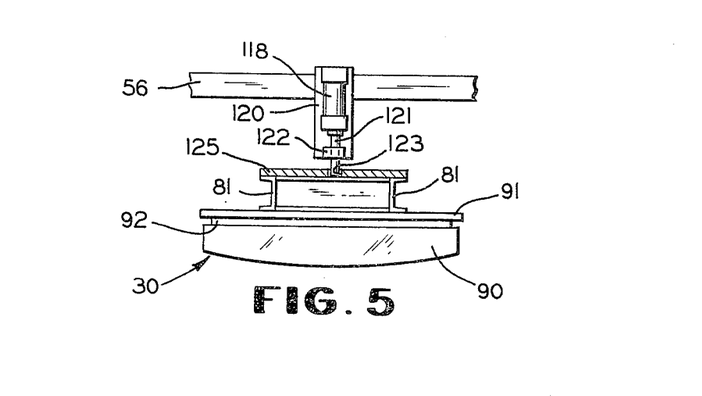
FIG. 5 is a vertical sectional view taken about on line 5—5 of FIG. 4, showing the means for locking the male mold member in an operative position.

Fluid under pressure is applied to the opposite ends of cylinder 118 for extending and retracting the plunger 121 by a suitable fluid control valve (not shown) operable by a conventional limit switch (also not shown) which is actuated when bracket 66 has reached a predetermined reverse pivotal movement upon its return back to its starting position to drive plunger 121 into opening 123 and lock male mold member 30 in its bending position. After bending, the cylinder 118 is operative to retract the plunger 121, releasing the male mold member 30 for pivotal movement.

In order to obtain a proper or full temper in a glass sheet having the requisite strain to meet particle size requirements when broken, the sheet must be in a substantially heat softened or viscous condition throughout. The glass sheet will reach this viscous state when the temperature thereof is above at least a predetermined minimum, on the order of about 1130° F. for example, and should be in this viscous condition throughout when subjected to rapid chilling or quenching to impart the desired internal stresses to the sheet. While the sheet is brought up to a temperature level above such minimum during initial heating for bending purposes, heat losses occur during bending as a result of the cooler ambient atmosphere in the bending area and the relatively cool bending equipment engaging said sheet. This heat loss is especially significant when bending relatively thin glass sheets, such as those having thicknesses ranging from 0.125 to 0.156 inch for example, because of the rapid rate of heat dissipation therefrom and can be of a magnitude sufficient to bring the temperature of the sheet below the level at which proper tempering can be effected. In order to compensate for the cooling effect occasioned during bending without initially overheating the glass sheet prior to bending and thereby abandon control over sagging and undesirable deformation, the present invention provides means for reheating the glass sheets after bending to make up such heat losses and bring the sheet up to the proper temperature to render it sufficiently viscous throughout for tempering.

To this end and, in accordance with the present invention, after the sheets have been bent to the desired curvature in the bending station 15 and returned to conveyor rolls 28, they are moved out of the bending station and are received on a plurality or series of third conveyor rolls 126, also part of the conveyor system 11, located downstream of female mold member 31. The series of conveyor rolls 126 receive the glass sheets from rolls 28, support and convey them to and through the boost heating station 16 and up to the tempering station 18.

Figure 2:
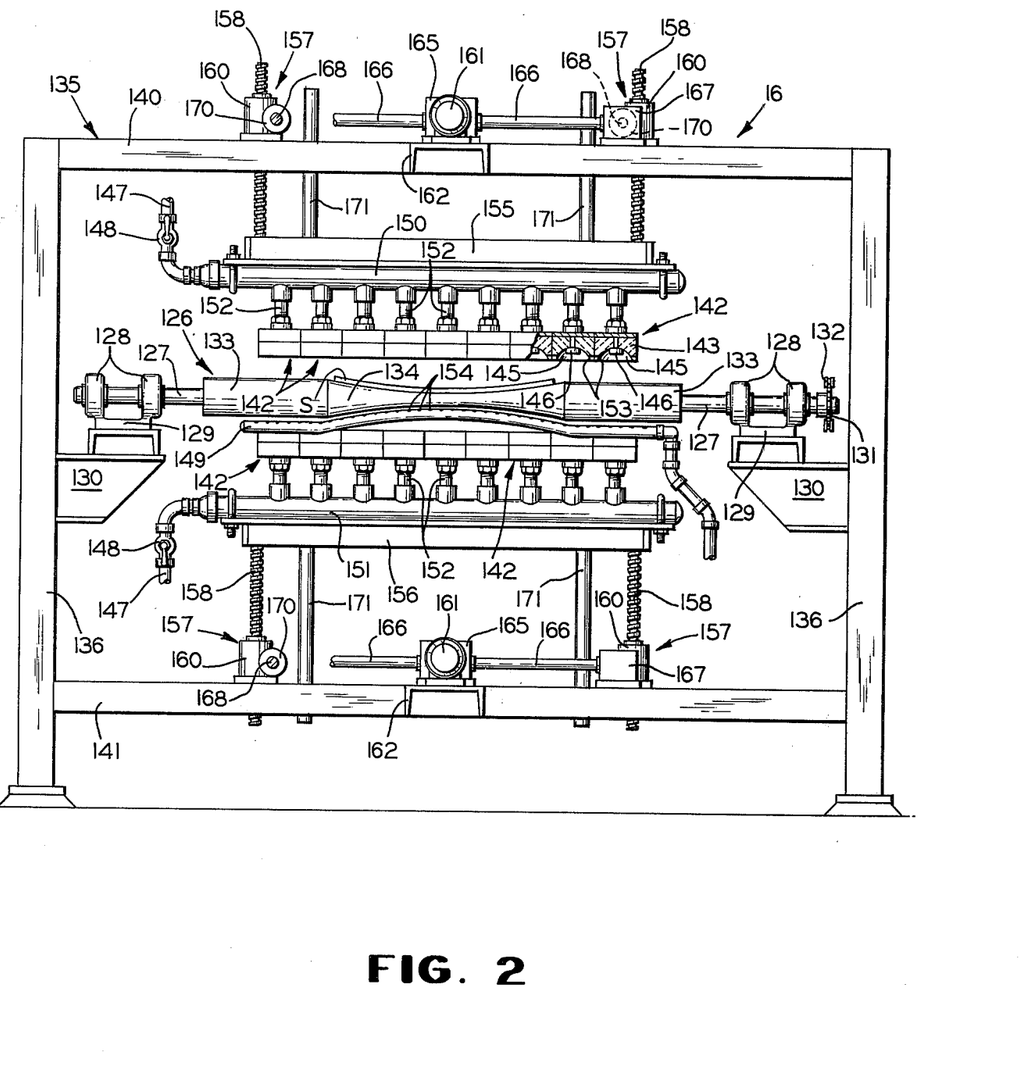
FIG. 2 is an end elevational view, on an enlarged scale, of the apparatus of FIG. 1, looking in the direction of the arrows 2—2 of FIG. 1 and showing one form of a boost heating station constructed in accordance with this invention.

As best shown in FIG. 2, each conveyor roll 126 is mounted on a shaft 127 journalled at each opposite end thereof in axially spaced bearings 128 extending upwardly from a common bearing block 129 mounted on rails 130 extending along the opposite sides of the framework constituting the boost heating station 16. One end of each shaft 127 extends outwardly beyond its respective bearings 128 and carries a sprocket 131 which is driven by an endless chain 132 powered from a suitable source to rotate the conveyor rolls 126 at a desired speed.

Because the conveyor rolls 126 support the glass sheets immediately after bending and during the reheating phase thereof, preferably they are contoured or shaped, as shown in FIG. 2, to fit the finished curvature of the bent sheets. Each conveyor roll 126 is formed from a suitable material and, as best shown in FIG. 2, is provided with a pair of cylindrical end sections 133 and a central section 134 having a progressively diminishing cross section from sections 133 inwardly toward the center thereof to provide an inwardly arched or convex curvature in front elevation complementary to the curvature of the heated bent glass sheets to prevent collapsing or sagging thereof out of the desired shape prior to reaching the tempering area. The contoured rolls 126 may be covered with fiberglass, if desired, to protect the surface of the bent sheet.

Boost heating section 16 includes a suitable framework 135 comprising two vertically disposed columns 136 located at each side of the conveyor and connected together in a longitudinally spaced apart relation by means of horizontally extending upper and lower structural beams 137 and 138. The columns 136 extend upwardly above conveyor rolls 126 and are laterally tied together at their upper and lower ends, respectively, by horizontally disposed upper and lower beams 140 and 141 extending transversely of the conveyor and secured at their respective opposite ends to the laterally aligned columns 136 to form a rigid box-like structure.

A plurality of gas fired radiant burners 142 disposed above and below the conveyor rolls 126 are arranged in an end-to-end abutting relation in longitudinally spaced rows extending transversely of the boost heating station 16 in substantial parallelism with the conveyor rolls 126. As best shown in FIG. 2, each of the burners 142 comprises a block 143 composed of a suitable refractory material and is formed to provide a cup-shaped cavity 145 for radiating the heat generated by the combustion of gases discharged through an apertured nozzle 146. The gases for combustion are conveyed from a suitable source of supply (not shown) through supply lines 147 having suitable control valves 148 therein and connected to a plurality of upper and lower manifolds or headers 150 and 151 corresponding in number to the number of rows of burners 142, each having a plurality of conduits 152 coupled to the nozzles 146, respectively. The burner blocks 143 are notched, as shown at 153 in FIG. 2, at their opposite ends to establish communication between adjacent cavities 145 causing the combustion gases and the flame to migrate longitudinally along the several burners in each row to form a composite elongated burner having an effective length equalling the sum of the lengths of the several burners 142.

Means are provided for directing air against the conveyor rolls 126 for cooling the same and to assist in maintaining the desired surface quality and bend in the sheet. To this end, compressed air from a suitable source (not shown) is directed to a manifold 144 extending lengthwise along one side of the boost heating station 16. A plurality of pipes 149, corresponding in number to the number of conveyor rolls 126 in boost heating station 16, are tapped at their one end into manifold 144 and extend transversely of the conveyor beneath and in close proximity to their respective conveyor rolls 126. The pipes 149 are provided with longitudinally spaced apertures 154 for directing the cooling air against the lower sides of the conveyor rolls 126 and are shaped complementary thereto to maintain an equal distance therebetween along their lengths.

The series of headers 150 and 151 are suitably secured to upper and lower carriages 155 and 156 mounted on frame 135 for vertical reciprocal movement toward and away from each other relative to the conveyor rolls 126. The means for raising and lowering upper carriage 155 comprises a plurality of jackscrew assemblies 157 mounted on the beams 140 and having elongated screws 158 fixedly secured at their lower ends to the carriage 155 and extending upwardly through rotatable nuts (not shown) journalled for rotation in jackscrew casings 160 but fixed against axial movement therein.

Figure 7:
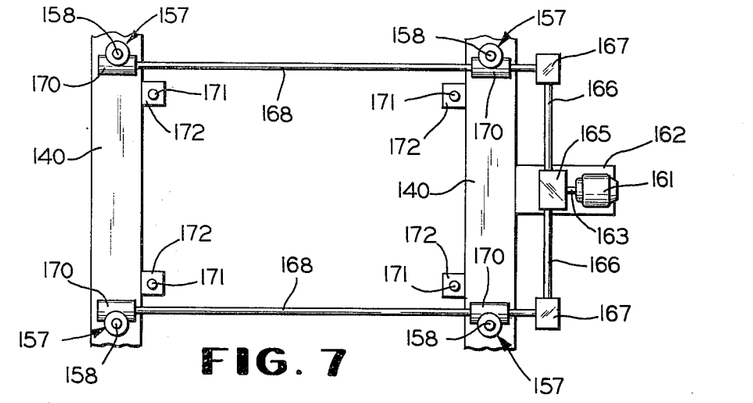
FIG. 7 is a fragmentary, diagrammatic top plan view of the drive arrangement for raising and lowering the boost heating sections.

Referring now to FIG. 7, the means for rotating the nuts include an electric motor 161 mounted on a horizontally extending structural beam 162 affixed to beam 140 and having an output shaft 163 connected through a suitable gear reduction mechanism 165 to a pair of transversely extending drive shafts 166. The shafts 166, in turn, are connected through suitable gear boxes 167 to right angularly related, longitudinally extending shafts 168, each having a pair of axially spaced worms diagrammatically designated 170 in FIG. 7, engagable with the circumferentially threaded rotatable nuts associated with the jackscrews 158. Thus, synchronous rotation of the shafts 168 and thereby worms 170 effected by motor 161 via the mechanical drive arrangement described above effects raising and lowering of screws 158 to elevate or lower carriage 155, as desired. A plurality of vertically extending guide posts 171 are fixedly secured at their lower ends to the carriage 155 and extend upwardly through suitable bushing blocks 172 mounted on beams 140 for vertical sliding movement relative thereto to guide the carriage 155 during its vertical reciprocal movement.

The mechanical arrangement for vertically moving and guiding the lower carriage 156 is identical but opposite to that described above in reciprocating carriage 155 and the same reference numerals are employed to identify similar parts. The selective vertical adjustment of carriages 155 and 156 enables the burners to be spaced at any desired distance from the opposite surfaces of the glass sheet being reheated and permits displacement of such burners away from the conveyor rolls 126 for unobstructed access thereto, when desired.

After the bent sheets have been reheated to the desired temperature for tempering in station 18, they are moved out of said station and are received on a plurality of fourth conveyor rolls 175, also part of the conveyor system 11, for conveying the reheated sheets through the tempering station 18. The conveyor rolls 175 are designed to adequately support the heated bent sheets in a manner maintaining their contour while permitting the maximum exposure of air thereto for rapid chilling. To this end, the rolls 175 preferably are of the spring-type (FIG. 6) made up from relatively large diameter wire, wound to an outside coil diameter of relatively small dimensions. The opposite ends of the wound coil or spring are received in the sockets of end members 176 having outwardly extending shafts 177 serving as support or drive shafts. Each of the spring rolls 175 is provided with a suitable protective covering of fiberglass or any other suitable non-abrasive material in the form of a sleeve 178 suitably secured adjacent the opposite ends thereof to end members 176.

Figure 6:
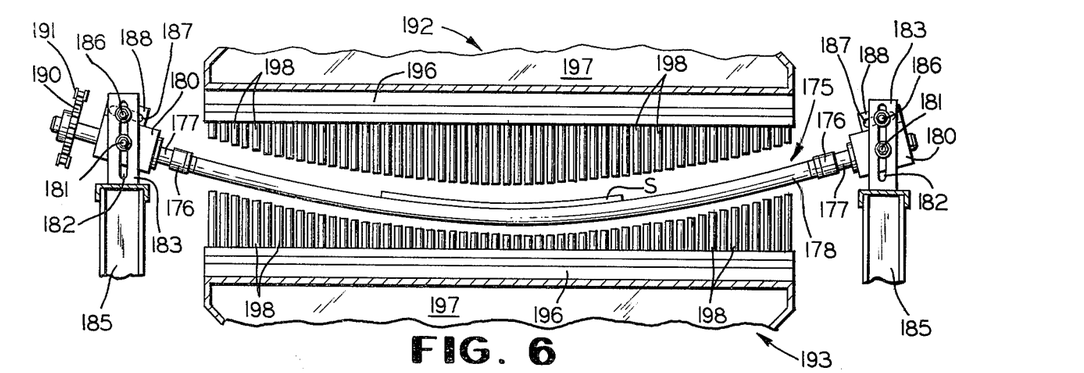
FIG. 6 is a vertical sectional view, on an enlarged scale, through the chilling or tempering station and taken about on line 6—6 of FIG. 1.

As shown in FIG. 6, the shafts 177 at either end of the rolls 175 are journalled in bearings 180 which are pivotally mounted, by means of pins 181 extending therefrom through vertical slots 182 in bearing brackets 183 carried on opposite sides of the tempering station 18 on suitable mounting structures 185. Pins 186 extend through the vertical slots 182 and through arcuate slots 187 of bearing extensions 188 to permit pivotal adjustment of the bearings. The pins 181 and 186 are threaded at their outer ends and provided with lock nuts or the like to retain the bearings in the selected adjusted position relative to brackets 183.

One end of each of the shafts 177 extends outwardly past its respective bearing and is provided with a sprocket 190 driven by an endless drive chain 191 from a suitable source of power (not shown) and the other or opposite end of each shaft 177 is slidably mounted in its bearing 180 to permit arching of the roll 175 as shown in FIG. 6. The adjustment of the degree or extent of arching is effected by selective pivotal movement of the bearing 180 associated with such roll 175. While the rolls 175 shown in the illustrated embodiment of FIG. 6 are arched downwardly to present a concave surface to the glass sheet passing thereover, it should be understood that they can be arched upwardly to provide a convex surface, if desired. The direction of arching, as well as the extent or degree of such arching, is dictated by the specifc configuration of the glass sheets being tempered. Forming the conveyor rolls 175 of relatively small diameters permits optimum exposure of the lower surface of the hot bent sheet to the cooling medium and also reduces the contact area of the rolls with the sheet surface to minimize scratching and marring of such surface.

The chilling means 20 in tempering station 18 comprises upper and lower blastheads 192 and 193 disposed above and below the path of movement of the glass sheets and are operable to direct opposed blasts of cooling fluid, such as air for example, toward and against the opposite surfaces of the sheets moving along such path. Each of the blastheads 192 and 193 comprise a plurality of sections 195, each including an elongated manifold 196 suitably secured to and communicating with a plenum chamber 197. A plurality of tubes 198 project from the outer surfaces of the manifolds 196 inwardly toward the path of movement of the sheet S to direct a plurality of streams of cooling gases from a pressure supply source via plenum chamber 197 and manifold 196 toward the opposite surfaces of the hot glass sheet.

It has been found that the spacing of the tube outlets from the opposite surfaces of a hot, thin glass sheet is an important consideration in air quenching in producing sufficient quantities of cooling gases at the opposite surfaces of the thin sheets at pressures which will not adversely affect the finished product. By suitable calculations, the optimum spacing for a particular tube size can be readily determined. Of course, this optimum spacing should extend throughout the entire surface areas of the sheet. To this end, the tubes 198 vary in length longitudinally of the respective section or transversely of the path of movement of the glass sheet to correspond to the curvature thereof, as shown in FIG. 6. The tubes 198 of the upper rows are lengthened from the opposite ends of their associated section 195 progressively toward the center thereof while the tubes of the lower rows are shortened from the opposite ends of their associated section progressively toward the center of the row to accommodate concavely bent glass sheets therebetween. The sections 195 preferably are removably secured to their respective plenum chambers 197 and, if desired, can be readily reversed to accommodate glass sheets of convexly shaped curvatures. Thus, varying the length of the tubes 198 to correspond to the cross sectional configuration of the sheet permits optimum spacing of the tube outlets relative to the opposite surfaces of the sheet for effective tempering.

To prevent "blow back" of the cooling air from the blastheads 192 and 193 rearwardly into the boost heating section 16, a slidable gate 200 is located between the boost heating station 16 and tempering station 18. The gate 200 is movable vertically between an open position shown in full lines and a closed position shown in dotted lines in FIG. 1 by means of an actuating cylinder 201 automatically operable to open the gate 200 just prior to the entry of a glass sheet into tempering station 18 and to close the gate 200 immediately after the sheet is completely contained therein.

To further preclude "blow back" from the tempering station 18 into the boost heating station 16 while the glass sheet is entering the latter, upper and lower stationary baffle plates 202 and 203 are located adjacent the inlet end of tempering station 18 to deflect and retain the cooling gases therein. These baffle plates, together with the sliding gate 200, are important in preventing dissipation of the cooling gases from station 18 while preventing undesirable heat losses in boost heating station 16.

Figure 9:
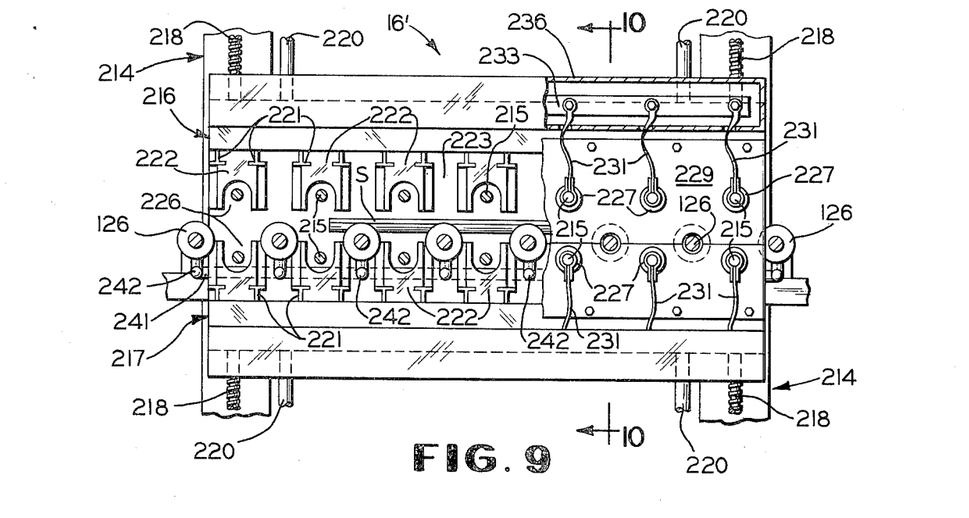
FIG. 9 is a fragmentary side elevational view of another form of a boost heating station of this invention, with parts removed for ease of illustration.
Figure 10:
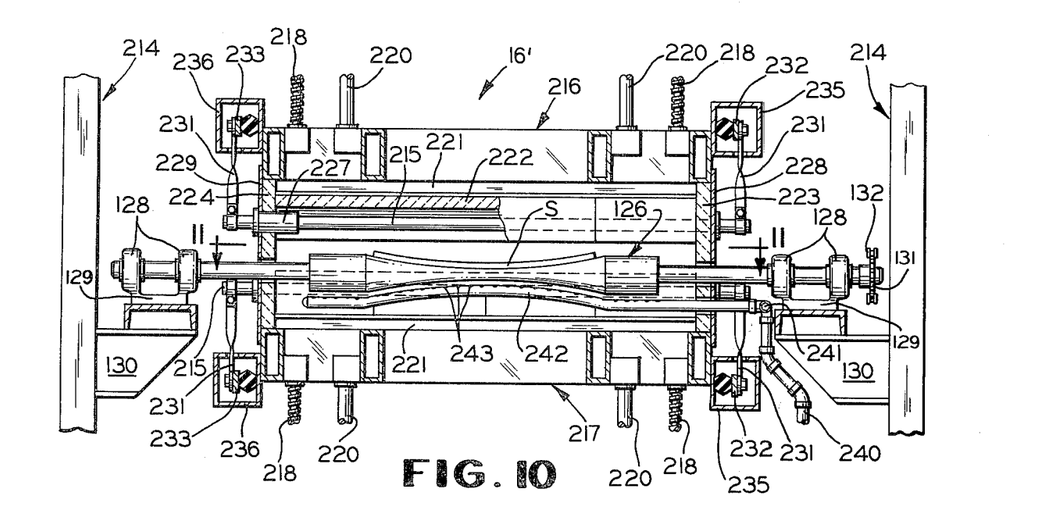
FIG. 10 is a vertical sectional view, taken about on line 10—10 of FIG. 9.
Figure 11:
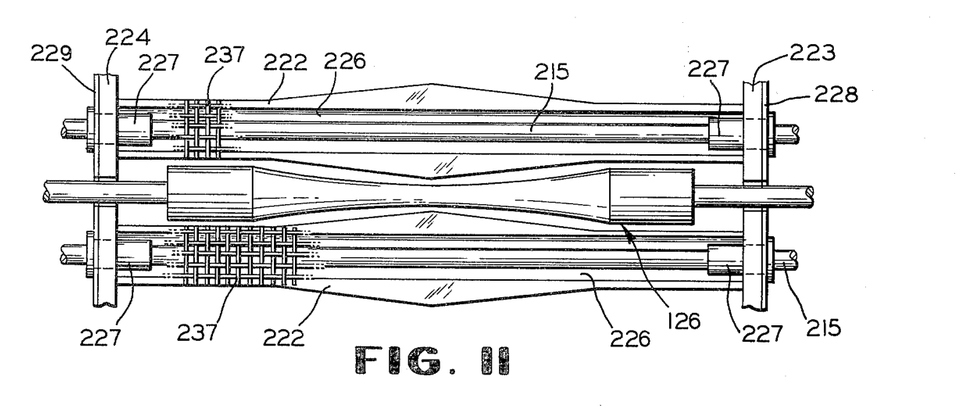
FIG. 11 is a horizontal sectional view, on an enlarged scale, taken about on line 11—11 of FIG. 10, showing the protective covering for the electrical heating elements incorporated in this form of the invention.

FIGS. 9 to 11 illustrate another form of boost heating station 16', which differs from that shown in FIG. 2 primarily by employing electrical resistance heating elements 215 in lieu of the radiant gas burners 142. The contoured conveyor rolls utilized in boost heating station 16', as well as their drive arrangements and mountings, are identical to those described and shown in connection with the form of the invention depicted in FIG. 2, and the same reference characters are used to designate similar parts.

The boost heating station 16' includes a suitable furnace frame 214 on which are supported upper and lower carriages 216 and 217 for vertical reciprocal movement toward and away from each other relative to the conveyor rolls 126. The means for raising and lowering carriages 216 and 217 include a plurality of elongated screws 218 fixedly secured at their inner ends to the carriages 216 and 217 and mounted for axial movement by means of jackscrew assemblies (not shown) mounted on the upper and lower ends of frame 214. A pluraliity of guide posts 220 are secured at their inner ends to the carriages 216 and 217 for guiding the same during reciprocal movement thereof.

Each of the carriages 216, 217 is provided with a plurality of longitudinally spaced, transversely extending, elongated structural T-shaped members 221 projecting inwardly toward conveyor rolls 126 for supporting blocks 222 extending transversely between plates 223 and 224. Blocks 222 preferably are formed of a suitable refractory material and have cavities 226 of a generally U-shaped configuration in cross section for partially encasing and shrouding the electrical heating elements 215. The confinement of heating elements 215 within cavities 226 of blocks 222 and their staggered or offset relation to conveyor rolls 126 precludes direct heat radiation from elements 215 to the rolls 126.

The elongated heating elements 215, disposed within the block cavities 226, extend transversely of the path of movement of the bent glass sheet with their opposite ends projecting through suitable insulated sleeves 227 mounted in and extending through end plates 223 and 224 and their respective cover plates 228 and 229. These opposite outer ends of heating elements 215 are connected by cable conductors 231 to bus bars 232 and 233 confined and extending lengthwise within housing elements 235 and 236 mounted on and extending along the opposite sides of each of the carriages 216 and 217.

A wire mesh screen 237, (FIG. 11) also formed of a suitable refractory material, can be positioned over the opened ends of cavities 226 of the lower row of housing blocks 222 to protect the relatively fragile heating elements against falling objects, such as falling pieces of glass resulting from a shattered glass sheet for example, or any other foreign articles accidentally dropped into the furnace section of boost heating station 16'.

Means are provided for directing air against the conveyor rolls 126 for cooling the same and to aid in maintaining the desired curvature in the bent sheets. To this end, compressed air from a suitable source (not shown) is directed, by means of a supply line 240, to a manifold 241 extending lengthwise along one side of the lower carriage 217. A plurality of pipes 242, having longitudinally spaced apertures 243 therein, respectively, are tapped at their one ends into manifold 241 and extend transversely of the conveyor system beneath and in close proximity to the conveyor rolls 126, respectively. The pipes 242 are bent complementary to their respective rolls 126 to maintain an equal distance therebetween along their lengths.

The mode of operation of the apparatus of this invention in bending and tempering one sheet of glass is as follows:

A flat glass sheet S is loaded onto the conveyor rolls 26 at the entrance end (not shown) of the furnace 13 for movement through the heating chamber 25 wherein the sheet is heated to substantially its softening point or bending temperature. This heated sheet passes through the opening 27 and is transferred onto conveyor rolls 28 for movement through station 15. The sheet is accurately located above the female member 31 when the leading edge thereof engages the stop member 43 located in its path of movement.

Upon entering the bending station 15, the glass sheet interrupts a beam L extending from the lamp source 205 to a photocell 206 suitably mounted by adjustable brackets 207 and 208, respectively, on the frame 32. Interruption of the light beam L produces a signal which, through a suitable control system (not shown), activates a timer controlling the speed of rolls 28 to decrease the speed thereof. As the sheet advances, it interrupts a second beam LL extending from the lamp source 210 to its associated photocell 211 suitably adjustably mounted on the frame 32 for activating a second timer controlling operation of the female mold member 31. The timing of the second control timer is such that when the leading edge of the glass sheet engages the locating stop members 43, cylinder 47 is actuated to raise the female mold member 31 upwardly to remove the sheet from conveyor rolls 28 and press the same against the male mold member 30 to shape sheet S into the desired curvature. During the upstroke of female mold member 31, cylinder 46 is actuated to retract stop members 43 to permit advancement of the sheet when subsequently returned to the conveyor rolls 28.

When the female mold member 31 reaches the end of its upstroke, it engages a suitable limit switch (not shown) to activate a timer controlling duration of bending and also connecting vacuum line 87 to the vacuum source, creating, via joint 86, passage 82, opening 95, manifold 93 and passages 96, a vacuum force along the male shaping surface 38. This negative pressure retains and holds the bent sheet S to shaping surface 38 as the bending timer times out to effect retraction of the female mold member 31. If desired, cooling fluid such as air for example, can be applied to at least the bottom surface of the bent glass sheet immediately after bending to slightly cool such surface while still supported on the male mold member 30 to form a skin thereon and preserve such surface against undesirable sagging or deformation out of its desired shape.

As the female mold member 31 is lowered, cylinder 118 (FIG. 5) is actuated to retract plunger 121 from opening 123 and permit rotation of male mold member 30. The cylinder 71 is then actuated to extend piston rod 70 and rotate the male mold member 90°. As the bracket 66 approaches the end of its arcuate movement, cam 117 engages roller 114 to actuate control valve 107 and effect a gradual deceleration of male mold member 30 to a stop, thereby avoiding vibrations thereof and the tendency to displace the bent glass sheet therefrom. The male mold member is then lowered by cylinders 50 a predetermined distance, at which time the vacuum source acting on sheet S is interrupted to release the same onto conveyor rolls 28.

After release of the glass sheet, the male mold member 30 is raised to clear the sheet and rotated 90° to its starting position, at which time cylinder 118 is actuated to extend plunger 121 into opening 123 for locking the male mold member against rotation and assuring accurate registration thereof with the female mold member 31 for the next bending cycle. Also, the speed of conveyor rolls 28 is increased for advancing the bent glass sheet into the boost heating station 16. When the trailing edge of the bent sheet leaves the last conveyor roll 28 in bending station 15, cylinders 46 are actuated to extend their piston rods 45 toward the path of movement of the glass sheet and position stop members 43 in such path above the rolls 28. With the male and female mold members in their starting positions, the stop members 43 in position to be engaged by a succeeding glass sheet, and the conveyor rolls 28 operated at their normal speed, the automatically occurring cycle of the bending apparatus is brought to completion and conditioned for a subsequent operation triggered by the advance of the next succeeding glass sheet into the bending station 15. To compensate for the heat losses occurring during the bending phase and to bring the bent sheet up to desired temperature for proper tempering, the bent glass sheet is transferred to the contoured conveyor rolls 126 for movement into and through boost heating section 16 or 16' at the proper rate of speed between the vertically spaced burners 142 or electrical resistance heating elements 215, respectively, to reheat the bent glass sheet and bring it to such desired temperature. However, the speed of the sheet at the entrance and exit ends of furnace section 17 is accelerated to speeds comparable with that of their movement through the bending station exit and tempering station entrance, respectively, by increasing the peripheral speed of those rolls 126 adjacent such zones relative to those located centrally of furnace section 17.

As the reheated sheet leaves boost heating station 16 or 16', cylinder 201 becomes operative by a suitable sensing device to retract and open gate 200 permitting entry of the sheet into tempering station 18 and onto the conveyor rolls 175. The peripheral speed of conveyor rolls 175 is set to advance the sheets between the opposed tubes 198 of blastheads 192 and 193 at a speed promoting a proper rate of cooling to obtain a quality temper in the sheets.

Actuation of cylinders 47, 50, 71, and 201 is effected by conventional fluid control valves, not shown. Proper sequencing of the operation of the several control valves, as well as the variation of speeds imparted to the several series of conveyor rolls, for effecting the foregoing operations is effected by conventional limit switches and/or by conventional timers incorporated in the electrical control system. Each of the switches and/or timers triggers subsequent stages of operation of the various actuators and conveyor roll drives and since such sequentially operable switches and timing arrangements are known and per se, form no part of the present invention, no detailed description or further amplification is believed necessary.

While the above operation was described in connection with a rotatable male mold provided with vacuum means, it should be understood that the method of this invention can be practiced with a fixed or non-rotatable mold member, if desired. The use of a rotatable mold is dictated by the optical and curvature requirements of the specific glass sheet being bent and its intended mounted orientation in an automotive or other sight opening. As noted earlier, the curvature of the male mold member shaping surface can vary in accordance with the size, shape and curvature of the bent glass sheet, and can include compound and complex bends. Where a glass sheet is bent along both major axes to effect a compound curvature therein, the sheet should be oriented after bending in a position disposing the greater curvature thereof in a direction transverse to the path of movement thereof through the blasthead to permit optimum spacing of the blasthead outlet tubes relative to the opposite surfaces of each sheet.

The preferred process according to this invention has been tested in a continuous production operation for successively bending relatively thin glass sheets and satisfactorily tempering the same to meet particle size requirements when broken. The glass sheets formed by this process were of a polygonal shape in plan intended for use as fixed quarter panels in automotive glazing closures. Each of the sheets had a thickness of approximately 0.125 inch, was approximately 31.5 inches long with one end having a width of 14 inches and the other end having a width of 3 inches. These sheets were advanced with their longer dimension parallel to the conveyor rolls, one by one, through the furnace whereby they were heated to a temperature ranging from about 1130°–1165° F. and then moved into the bending station. After being bent to a desired compound curvature and reoriented 90° in a horizontal direction, the sheets were returned to the conveyor rolls and advanced into and through the boost heating station. The glass sheets entered and exited the bending station at a high transfer rate of speed of approximately 1325 inches per minute and the total draw time, i.e., time from heating furnace, through the bending cycle and to the boost heating furnace, was 7 seconds, the sheets being cooled approximately 80° F. during such draw time. The glass sheets were reheated to make up heat losses occurring during the bending cycle and brought up to a suitable temperature for proper tempering, e.g., temperatures ranging from 1130° F. to 1180° F., and preferably about 1165° F. The total time of reheating was 7 seconds with the high transfer rate of speed of the sheets at the entrance and exit ends of the boost heating furnace being approximately 1325 inches per minute. Upon leaving the boost heating furnace, the sheets were advanced immediately into and through the blastheads of the tempering station.

From the foregoing, it is apparent that the objects of the invention have been fully accomplished. An improved method and apparatus is provided for bending and tempering relatively thin glass sheets in an efficient manner by interposing a boost heating arrangement between the bending and tempering stations of an existing horizontal production line in which the sheets are moved bodily in a horizontal disposition for the purpose of reheating the glass sheets immediately after bending to bring the bent sheets up to the desired temperature for proper tempering. By the provision of a rotatable male mold member provided with vacuum means, the thin glass sheets can be bent in a manner minimizing optical defects and then reoriented into the most favorable position for subsequent tempering.

It is to be understood that the forms of the invention herewith shown and described are to be taken as illustrative embodiments of the same, and that various changes in the shape, size and arrangement of parts, as well as various procedural changes, may be resorted to without departing from the spirit of the invention.

We claim:

1. A method of bending and tempering relatively thin glass sheets comprising: supporting a thin glass sheet in a substantially horizontal plane and moving the same bodily in a generally horizontal path successively through a series of operations, initially heating the glass sheet uniformly substantially to the softening point thereof in a furnace while advancing said sheet in said path, removing said heated sheet from said furnace, pressing said heated sheet between complemental shaping surfaces to a desired curvature, reheating said bent sheet while advancing the same in said path to render said sheet sufficiently viscous throughout for proper tempering, and immediately cooling said reheated bent sheet rapidly by directing streams of cooling gases against opposite surfaces thereof for tempering the same while continuously advancing said sheet in said path.

2. A method according to claim 1, including reorienting said bent sheet immediately after bending for further advancement in said path in a position maintaining the desired curvature in said bent sheet during reheating and assuring proper tempering.

3. A method according to claim 1, wherein said glass sheet is initially supported in a given horizontal orientation, and pivoting said glass sheet in a horizontal direction immediately after bending for advancement in said path in a desired orientation different from said given orientation.

4. A method according to claim 3, wherein said glass sheet is pivoted 90° after bending to position said sheet in an orientation normal to said initially supported orientation.

5. A method according to claim 1, including displacing said sheet in a direction normal to said path after the initial heating and prior to the pressing thereof between said complemental shaping surfaces to effect said desired curvature.

6. A method according to claim 5, including interrupting movement of said sheet in said path before displacing the same, reorienting said sheet in a horizontal plane immediately after bending, and returning said bent sheet in said reoriented position to said path for further advancement therealong.

7. A method according to claim 1, wherein said bent sheet is reheated to a temperature in the range of from about 1130° F. to 1180° F. prior to rapidly cooling the same.

8. A method according to claim 1, wherein said bent sheet is reheated to a temperature of about 1165° F. prior to rapidly cooling the same.

9. Apparatus for bending and tempering relatively thin glass sheets comprising: a conveyor for supporting a thin glass sheet in a substantially horizontal plane and moving the same along a generally horizontal path successively through a first, second, third and fourth station, said first station having a furnace for initially heating said glass sheet uniformly to substantially the softening point thereof as said sheet advances therethrough, said second station having means including opposed mold members exteriorly of said furnace for pressing said heated sheet to a desired curvature about at least one axis normal to said path of movement of said sheet, means for rotating one of said mold members in a horizontal plane after pressing to reorient said sheet and thereby said one axis in a direction parallel to said path of movement for subsequent conveyance in an optimum position through a tempering area, said third station having boost heating means for reheating said reoriented bent sheet while advancing the same therethrough to render said sheet sufficiently viscous throughout for proper tempering, and said fourth station having chilling means for rapidly cooling and tempering said reheated sheet during movement thereof in said reoriented position through said fourth station.

10. Apparatus according to claim 9, wherein said boost heating means includes a furnace section having opposed carriages mounted for vertical reciprocable movement relative to said conveyor and provided with means for generating heat and directing the same against the opposite surfaces of said sheet.

11. Apparatus according to claim 10, wherein said heat generating means comprises a plurality of gas burners.

12. Apparatus according to claim 10, wherein said heat generating means comprises a plurality of electrical resistance heating elements.

13. Apparatus according to claim 9, wherein said chilling means comprises a pair of opposed blastheads each having a plurality of tubes for directing streams of a gaseous cooling medium against the glass sheet upon movement thereof between said blastheads.

14. Apparatus according to claim 13, wherein said plurality of tubes are arranged in rows extending transversely of the path of movement of the glass sheet, the tubes of each row being varied in length to space their respective outlets a predetermined distance from the glass sheet surfaces.

15. Apparatus according to claim 13, including reciprocal gate means interposed between said third and fourth stations for interrupting communication therebetween.

16. Apparatus according to claim 13, including baffle plates mounted on said opposed blastheads for deflecting and retaining said cooling medium within said fourth station.

17. Apparatus for bending and tempering relatively thin glass sheets comprising: a conveyor for supporting a thin glass sheet in a substantially horizontal plane and moving the same along a generally horizontal path successively through a first, second, third and fourth station, said first station having means for heating said glass sheet to substantially the softening point thereof, said second station having means for bending said heated sheet to a desired curvature, said third station having boost heating means for reheating said bent sheet while advancing the same therethrough to at least a temperature sufficient for proper tempering, said fourth station having chilling means for rapidly cooling and tempering said reheated sheet during movement thereof through said fourth station, said bending means comprising an upper rotatable mold member and a lower mold member having opposed, complementary shaping surfaces, means holding said bent sheet to said upper mold member, and means for horizontally pivoting said upper mold member immediately after bending for repositioning said bent sheet relative to its prebent orientation for subsequent release on said conveyor.

18. Apparatus according to claim 17, wherein said holding means includes vacuum means for generating a suction force along the shaping surface of said upper mold member.

19. A bending apparatus comprising: a frame, upper and lower mold members having opposed complemental shaping surfaces and mounted on said frame for reciprocal movement relative thereto, conveyor means for supporting and positioning a horizontally disposed glass sheet having a given axial orientation between said mold members, means moving said lower mold member vertically toward said upper mold member to press said glass sheet between said opposed shaping surfaces, means retaining said sheet against said upper mold shaping surface upon movement of said lower mold away therefrom, and means for rotating said upper mold member about a vertical pivot axis to reorient said bent sheet relative to the prebent orientation thereof for subsequent release on said conveyor means.

20. Apparatus according to claim 19, wherein said means for rotating said upper mold member comprises an upright post supporting said upper mold member, means supporting said upright post on said frame for pivotal movement relative thereto, and means for pivoting said upright post about a vertical pivot axis between a bending position and a sheet releasing position.

21. Apparatus according to claim 20, wherein said supporting means comprises a bearing having an inwardly directed flange, and said upright post having an outwardly directed flange supported on said first mentioned flange in bearing engagement thereagainst for rotary movement relative thereto.

22. Apparatus according to claim 20, including means for locking said upper mold member in said bending position to assure vertical registration of said upper and lower mold members.

23. Apparatus according to claim 19, wherein said retaining means comprises vacuum means including a source of vacuum and passage means in said upper mold member communicating with the shaping surface thereof.

24. Apparatus according to claim 19, including means for selectively angularly positioning said upper mold member in one of at least two angularly spaced apart bending positions.

25. Apparatus according to claim 24, wherein said selective positioning means includes a sleeve receiving said upright post for rotary movement relative thereto, said sleeve having a radial opening adapted to register with one of at least two circumferentially spaced apart radial openings in said upright post, and a lock pin insertable into the selectively aligned openings of said sleeve and said post, respectively.

* * * * *